United States Patent
Sato et al.

(10) Patent No.: US 7,292,001 B2
(45) Date of Patent: Nov. 6, 2007

(54) GAIN ADJUSTING METHOD FOR SERVO CONTROL DEVICE

(75) Inventors: Kazuo Sato, Fukuoka (JP); Yasufumi Yoshiura, Fukuoka (JP)

(73) Assignee: Kabushiki Kaisha Yasakawa Denki, Fukuoka (JP)

( * ) Notice: Subject to any disclaimer, the term of this patent is extended or adjusted under 35 U.S.C. 154(b) by 0 days.

(21) Appl. No.: 10/520,731

(22) PCT Filed: Jul. 4, 2003

(86) PCT No.: PCT/JP03/08548

§ 371 (c)(1),
(2), (4) Date: Sep. 19, 2005

(87) PCT Pub. No.: WO2004/008624

PCT Pub. Date: Jan. 22, 2004

(65) Prior Publication Data

US 2006/0087275 A1    Apr. 27, 2006

(30) Foreign Application Priority Data

Jul. 11, 2002    (JP) ............................. 2002-202705

(51) Int. Cl.
*G05B 5/01* (2006.01)

(52) U.S. Cl. ...................... 318/623; 318/609; 318/610; 318/630

(58) Field of Classification Search ............... 318/560, 318/561, 570, 571, 572, 700, 630, 632, 727; 702/75
See application file for complete search history.

(56) References Cited

U.S. PATENT DOCUMENTS

| | | | | |
|---|---|---|---|---|
| 4,864,209 A | * | 9/1989 | Seki et al. ................... | 318/611 |
| 5,157,597 A | | 10/1992 | Iwashita | |
| 5,301,101 A | * | 4/1994 | MacArthur et al. ........... | 700/36 |
| 5,475,291 A | | 12/1995 | Yoshida et al. | |
| 5,598,077 A | * | 1/1997 | Matsubara et al. .... | 318/568.22 |
| 5,786,678 A | * | 7/1998 | Kobayashi et al. ......... | 318/677 |
| 5,936,366 A | | 8/1999 | Hamamura et al. | |
| 6,622,099 B2 | * | 9/2003 | Cohen et al. .................. | 702/75 |
| 6,650,078 B1 | * | 11/2003 | Chaffee ........................ | 318/630 |
| 6,710,965 B2 | * | 3/2004 | Ding et al. ............... | 360/77.02 |
| 6,742,391 B2 | * | 6/2004 | Kozaki ........................ | 73/579 |
| 6,844,693 B2 | * | 1/2005 | Tazawa et al. .............. | 318/561 |
| 6,912,426 B1 | * | 6/2005 | Kerner .......................... | 700/8 |

(Continued)

FOREIGN PATENT DOCUMENTS

| | | |
|---|---|---|
| JP | 6-242833 A | 9/1994 |
| JP | 7-281708 A | 10/1995 |
| JP | 11-313495 A | 11/1999 |
| JP | 11-346492 A | 12/1999 |

*Primary Examiner*—Paul Ip
(74) *Attorney, Agent, or Firm*—Sughrue Mion Pllc.

(57) ABSTRACT

An object of this invention is to provide a gain adjusting method in a servo control device to suppress changes according to a place where a machine is located.

This invention provides a gain adjusting method for a servo control device providing speed control of inputting a difference between speed feedback supplied from a servo motor and a command value to output a torque command, characterized in that after a speed loop gain is increased to detect vibration at each of points moved over a movable range of a machine, the speed loop gain is decreased to detect the gain when the vibration becomes still as a maximum value, thereby providing a set gain value corresponding to a machine.

9 Claims, 12 Drawing Sheets

U.S. PATENT DOCUMENTS

| | | | |
|---|---|---|---|
| 7,030,588 B2* | 4/2006 | Tsuruta et al. | 318/727 |
| 7,068,923 B2* | 6/2006 | Miyazaki | 388/806 |
| 2002/0019715 A1* | 2/2002 | Cohen et al. | 702/75 |
| 2002/0022903 A1* | 2/2002 | Krah et al. | 700/170 |
| 2002/0153857 A1* | 10/2002 | Iwaji et al. | 318/700 |
| 2002/0156541 A1* | 10/2002 | Yutkowitz | 700/28 |
| 2002/0176201 A1* | 11/2002 | Hsin et al. | 360/78.05 |
| 2003/0029240 A1* | 2/2003 | Kozaki | 73/579 |
| 2003/0199997 A1* | 10/2003 | Gao | 700/18 |
| 2003/0201747 A1* | 10/2003 | Chaffee | 318/630 |

* cited by examiner

(iii)

FIG. 7

JL = 0 VIBRATION DURING STOPPING

(SEQUENCE PROCESSING)

FIG. 13

EXEMPLARY SEQUENCE

1. MOVE IN MOVABLE RANGE
2. INCREASE
3. OBSERVE VIBRATION → INCREASE GAIN SLIGHTLY IF VIBRATION OCCURS
4. FAST MOVE IN MOVABLE RANGE
5. CONFIRM POSITIONING IN AT NORMAL SPEED
6.

GAIN ADJUSTING METHOD FOR SERVO CONTROL DEVICE

TECHNICAL FIELD

This invention relates to control of a servo motor for driving a machine such as a direct-acting table, an X-Y table or a robot, and more particularly to (1) a gain adjusting method for a servo control device in a machine which can operate even when an oscillation characteristic is changed as a result that the supporting condition and posture of a machine have been changed by the operation of the machine; (2) where the servo control gain in a servo control device is automatically set, in a method for extracting a control gain from the response of the oscillation by increasing the control gain, to a gain adjusting method for suppressing the control gain from the oscillation during stopping; (3) similarly, where the servo control gain in a servo control device is automatically set, in a method for detecting the limited value of a servo control gain by detecting excitation and oscillation by an exciting member particularly in a machine, to a gain adjusting method for selecting a control method such as an observer to acquire an optimum control; and (4) to a gain control method of increasing the gain from the information obtained when run by generating a command by an external operation and from a sequence after the sequence of tuning has been built into a servo control device.

BACKGROUND ART

Figure 15:
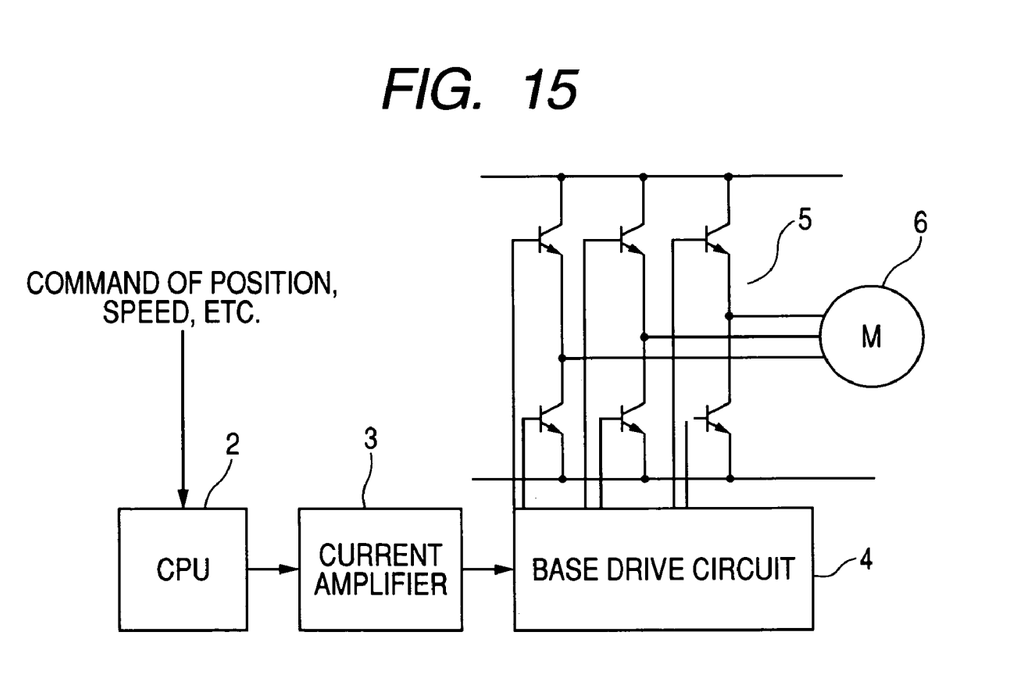
FIG. 15 is view showing a conventional servo control device.

A conventional general servo control device, as shown in FIG. 15, includes a servo motor 6 to be controlled, an inverter section for driving the motor 6 by switching transistors 5 through a base drive circuit 4, a CPU 2 for operating position control and speed control, and a current amplifier 3 for issuing a driving command to the base drive circuit 4 in response to the current command received from the CPU 2.

An example of the gain control method in the servo control device is a "system for oscillation detection and speed loop gain automatic adjustment in a servo system" disclosed in JP-A-Hei2-261083. In this case, the servo motor is subjected to stick-stepping so that it is also rotated in an opposite direction. This is repeated to increase the speed loop gain continuously, thereby generating oscillation. The acceleration change obtained by differentiating an actual speed change in the servo motor is frequency-analyzed to detect the oscillation in the servo system. While the oscillation frequency thus obtained and a prescribed reference frequency are being compared with each other, the speed loop gain is adjusted so that the oscillation frequency accords with the reference frequency and becomes a value in vicinity thereof.

Further, in an "automatic adjustment servo control device" disclosed in JP-A-Hei6-242833, in order that the servo motor can follow a change in a load machine connected thereto, the operation of the servo motor is started with an optimum parameter under a predetermined standard load. On the basis of the observation for a predetermined period from when the operation has been started, by integrating a difference between the deviation counter curve during the period and a standard model of the deviation counter curve when the optimum parameter based on a prescribed standard load is used, an actual load is estimated. By referring to a table showing various loads previously created and stored and the corresponding optimum control parameters, the parameter can be changed into the optimum control parameter corresponding to the actual load.

However, as regards the prior arts described above, in the case of JP-A-Hei2-261083, the gain is increased to oscillate the servo system, and the gain when the servo system is oscillated is set as a maximum value.

Specifically, since the parameter adjustment is carried out at the increased gain, there is no margin of the adjustment. Further, since the gain oscillated at a certain place (or position) of a machine is computed, if the place of the machine is shifted, the gain also varies so that there are differences in the gain according to the place of the machine. At a certain position of the machine, vibration occurs.

Further, in the case of JP-A-Hei6-242833, since the observation must be continued for a prescribed period, differences cannot be suppressed according to the place. Further, since only the load varies, accurate adjustment of the parameter cannot be performed.

Therefore, a first object of this invention is to provide a gain adjusting method for a servo control device capable of surely making auto-tuning with no difference according to a place by performing the gain adjustment not only at a specific position of a machine but also over an entire movable range thereof in a servo motor for driving the machine and a servo control device.

Further, in the case of JP-A-Hei2-261083, the gain is increased to oscillate the servo system, and the gain when the servo system is oscillated is set as a maximum value. Namely, taking the machine into consideration at this time, the gain is set at the maximum value or adjusted. Further, in the case of JP-A-Hei6-24283, the state of the load was estimated from the deviation counter, and the control parameter was selected from the state of the load to adjust the controlled gain. Namely, the gain for the position control or speed control was determined according to the load.

Figure 16:
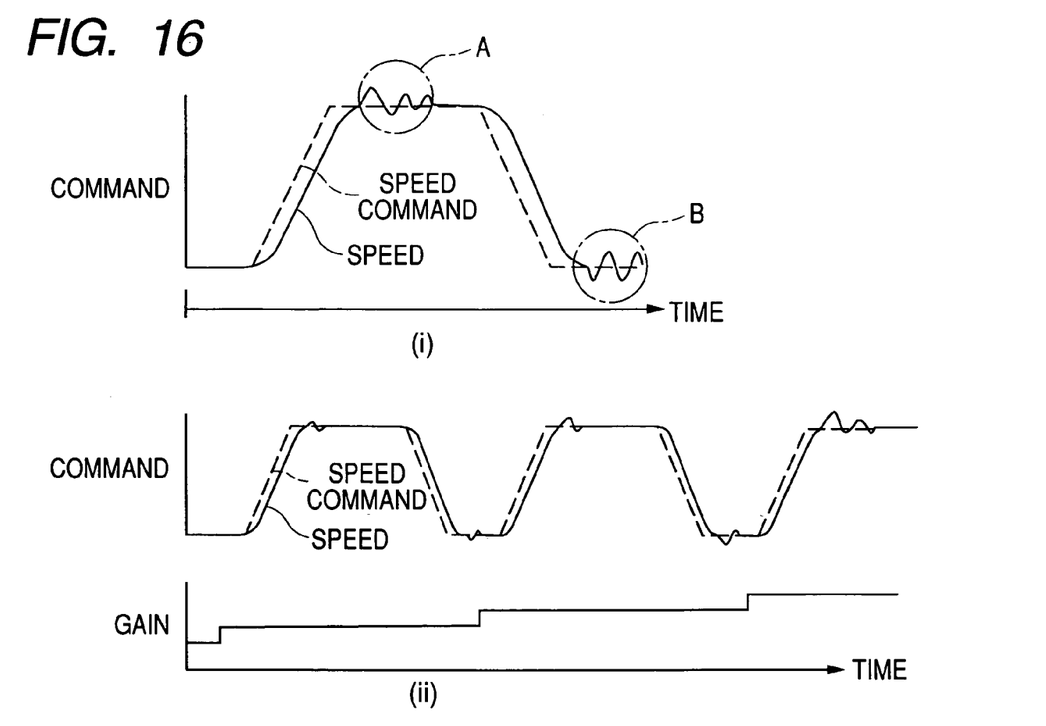

Meanwhile, in the prior arts described above, since the oscillation can be observed only after the gain is increased to realize the oscillating state, it takes a long time for the adjustment of the gain. Specifically, while the machine stops, the machine does not oscillate immediately after the gain has been increased. Further, also while the machine runs, it starts to oscillate from points where the oscillation is likely to occur, as indicated by A and B in FIG. 16(i). In other words, since the machine is subjected to friction or load and they act to suppress the oscillation, unless there is a great chance, the oscillation does not occur. Thus, as shown in FIG. 16(ii), in order to cause oscillation easily, it is necessary to expect the time delay until the oscillation starts by issuing a long command at a high speed for each time, thereby increasing the gain slowly so that it is increased only once by a single command. This presents a problem that it takes a long time for the maximum gain to be detected.

Figure 17:
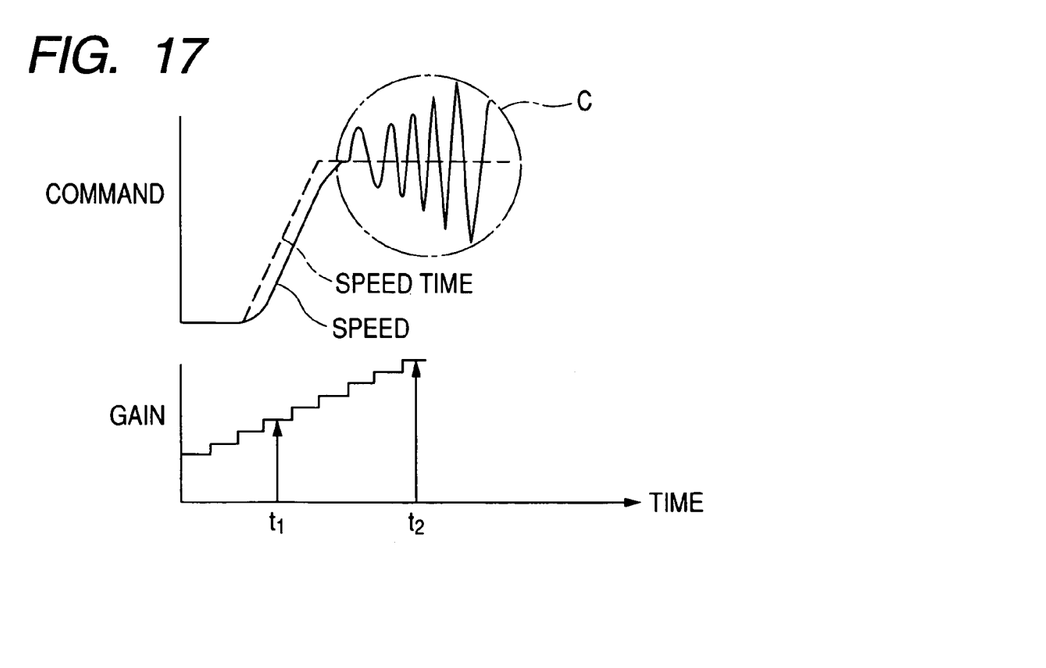
FIG. 17 is a timing chart of abruptly increasing the gain to cause great oscillation in adjustment during the normal running.

FIG. 17 shows the case where the above matter is ignored and the gain has been increased quickly. At timing t1, the gain has been already increased excessively so that at timing t2 when the oscillation is detected, the gain is increased more excessively. Therefore, even when the gain is decreased, as indicated by C in FIG. 17, the oscillation does not stop easily so that the machine vibrates greatly. Also in the case where the machine does not oscillate but a little vibrates, there is slight vibration or noise. This was problematic.

In view of the above matter, a second object of this invention is to vibrate the machine by increasing the gain but to suppress slight vibration while the machine stops, thereby stabilizing the machine.

Further, a third object of this invention is to provide an optimum control method which vibrates the machine by increasing the gain but detects the vibration early to stop the machine instantaneously, thereby not vibrating the machine greatly.

In the prior arts described above, since the controller issued a command, the oscillation or the maximum value of the gain was decided by the controller, thereby performing automatic tuning of the gain. However, because of the data transfer delay between the controller and the servo and since the interval of the processing scan in the controller is later than in the servo, the above decision cannot be made instantaneously to take a long time. Further, even when the oscillation occurs because of a difference in machines, the operation of decreasing the gain cannot be carried out instantaneously.

The invention disclosed in JP-A-Hei6-24283 presents a problem that the above instantaneous decision cannot be made.

In view of this matter, a fourth object of this invention is to determine oscillation in real time by installing the operation sequence of auto-tuning actuated by an external operation into a servo, thereby automatically adjusting servo gain.

DISCLOSURE OF THE INVENTION

In order to attain the above object, the invention described in claim 1 is a gain adjusting method for a servo control device providing speed control of inputting a difference between speed feedback supplied from a servo motor and a command value to output a torque command, characterized in that after a speed loop gain is increased to detect vibration at each of a plurality of points moved over a movable range of a machine, the speed loop gain is decreased to detect the gain when the vibration becomes still as a maximum value, thereby providing a set gain value corresponding to a machine.

In the gain adjusting method for a servo control device, after the speed loop gain is increased to detect vibration at each of points moved over a movable range of a machine, the speed loop gain is decreased to detect the gain when the vibration becomes still as a maximum value for gain adjustment. Since the gain where the vibration becomes still is used, the margin for the vibration is given. Changes according to the places of a machine can be suppressed.

In accordance with the invention described in claim 2, the set gain value is set at a minimum value of gain values detected at the plurality of points.

In this gain adjusting method for the servo control device, the loop gain is adjusted at each of adjustment points over the movable range of the machine. The minimum value of the loop gains detected at the adjustment points is determined as the entire loop gain. For this reason, the gain is stable for the vibration and changes thereof according to the places of the machine can be suppressed.

In accordance with the invention of a method for adjusting a controlled gain described in claim 3, in a device for driving a servo motor provided with a vibration detecting member for detecting vibration of a control system, running such as acceleration/deceleration is performed at an increased controlled gain, and when the vibration is detected by the vibration detecting member while the control system stops, decreasing the controlled gain.

In accordance with the invention described in claim 4, in the method for adjusting a controlled gain according to claim 3, the vibration during stopping is detected from torque in the normal running is detected, and when the vibration is detected by the vibration detecting member, the controlled gain is decreased.

In accordance with the invention described in claim 5, in the method for adjusting a controlled gain according to claim 3, the vibration during stopping in the normal running is detected, and when the vibration is detected at an increased gain, the gain at this time is determined as a maximum gain.

Through these members, the normal running is performed, and by adjusting the controlled gain, the vibration during stopping and noise can be suppressed.

In accordance the invention of acquiring an optimum control method described in claim 6, in a servo control device for driving a servo motor which is provided with a vibration detecting member for detecting vibration in a control system and an exciting member for adding, to a torque command, simulated disturbance torque giving vibration at a predetermined level at an increased controlled gain, a method for adjusting a controlled gain, wherein a control method such as an observer is selected as the optimum control method in a limited gain extracting method including the steps of determining as a limited gain the gain when the vibration exceeding the predetermined level is detected by the vibration detecting member, repeating the processing of giving the excitation having an adjusted magnitude by the exciting member, detecting the vibration by the vibration detecting member, and adding the simulated disturbance torque while increasing the controlled gain until the vibration at the predetermined level is detected.

In accordance with the invention described in claim 7, in the method for adjusting a controlled gain according to claim 6, in selecting the control method such as the observer to provide an optimum control method, the control method with a higher value of the limited gain is selected as an optimum control method.

In accordance with the invention described in claim 8, in the method for adjusting a controlled gain according to claim 6, and in the method for selecting the control method such as the observer to provide an optimum control method, wherein the control method with a higher value of the limited gain is selected as an optimum control method, if pertinent control methods have equal limited gains, by increasing the simulated disturbance torque, the margin of the controlled gain where the vibration at a predetermined level is detected, and the control method providing a larger margin is selected.

Through the above members, the machine is surely vibrated at the controlled gain suited thereto to acquire the maximum gain. Thus, the optimum control method can be automatically selected and adjusted.

In accordance with the invention of the gain adjusting method described in claim 9, in again adjustment method for a servo control device providing speed control of inputting a difference between speed feedback supplied from a motor and a command value to output a torque command, tuning is implemented in such a manner that a servo control device for driving a servo motor is run by generating a command by an external operation of an operator and from a sequence of tuning build in the device, and the gain is adjusted by the information obtained upon running.

Through the above members, since the sequence by the external operation is built into the servo control device, the gain can be detected in real time and also hence can be instantaneously determined from the information obtained at this time when any event occurs. Further, even when the vibration occurs because of differences in machines, it can be dealt with instantaneously.

BRIEF DESCRIPTION OF THE DRAWINGS

FIG. 6(i) illustrates timings of detection of a vibration level during stopping.

FIG. 6(ii) illustrates extension of the vibration level during stopping.

FIG. 6(iii) illustrates timings of adjustment of a control gain.

FIG. 16(i) is a timing chart of vibration during the normal running.

FIG. 16 (ii) is a timing chart of increasing the gain during the normal running.

Reference numerals in the drawings are as follows.
1: vibration detecting member
2: microcomputer
3: amplitude
4: base drive circuit
5: power transistor module
6: motor
11: speed control block
12: 1/JS
21: table
22: ball screw
51: position loop gain
52: speed control
53: 1/JS corresponding to a motor and load
54: integration
61: operator

BEST MODE FOR CARRYING OUT THE INVENTION

Now referring to the drawings, an explanation will be given of the first embodiment of this invention.

Figure 1:
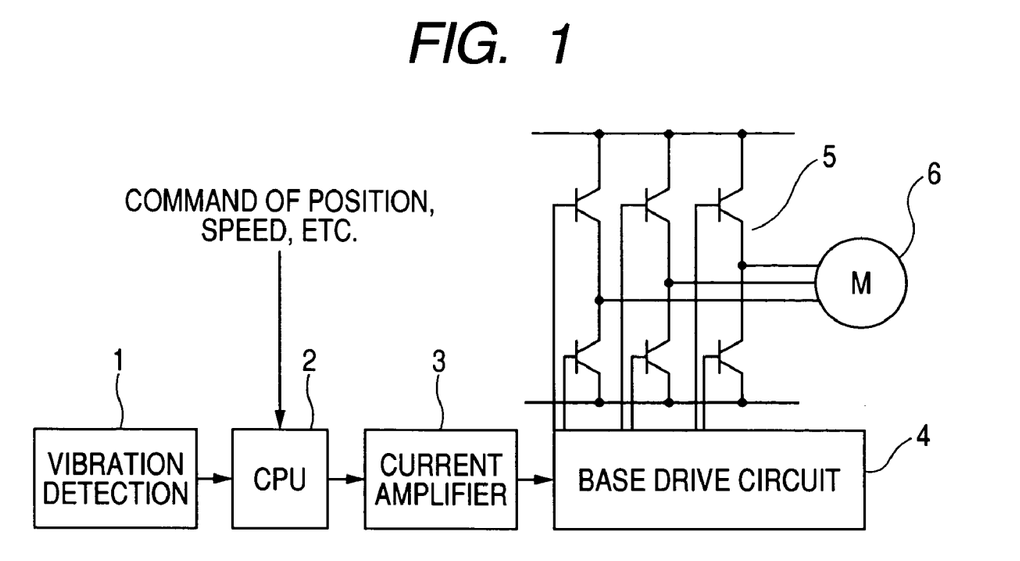
FIG. 1 is a view showing the configuration of a servo control device commonly related to each of various embodiments of this invention.

FIG. 1 is a view showing the configuration of a servo control device according to an embodiment of this invention.

Figure 2:
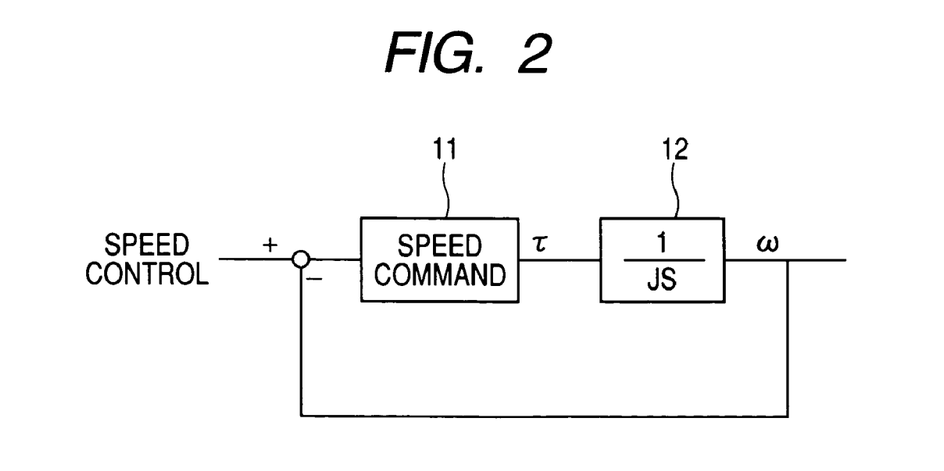
FIG. 2 is a control block diagram of the servo control device shown in FIG. 1.

FIG. 2 is a control block diagram of the servo control device shown in FIG. 1.

Figure 3:
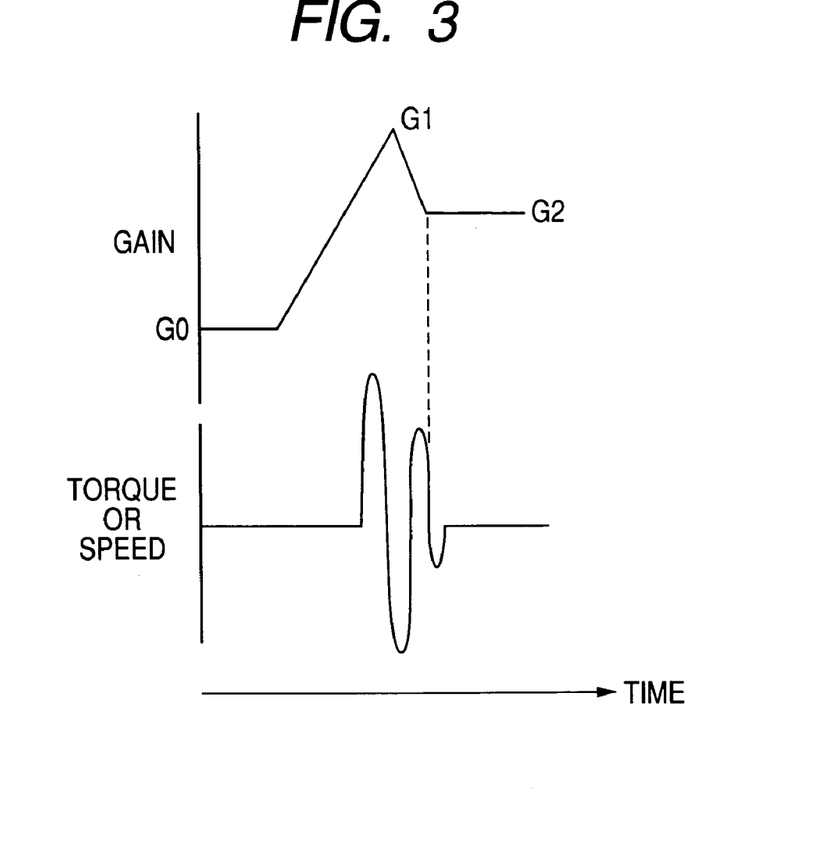
FIG. 3 is a timing chart of a gain increased to cause vibration and thereafter decreased and a torque.

FIG. 3 is a timing chart of a gain increased to cause vibration and thereafter decreased and a torque.

Figure 4:
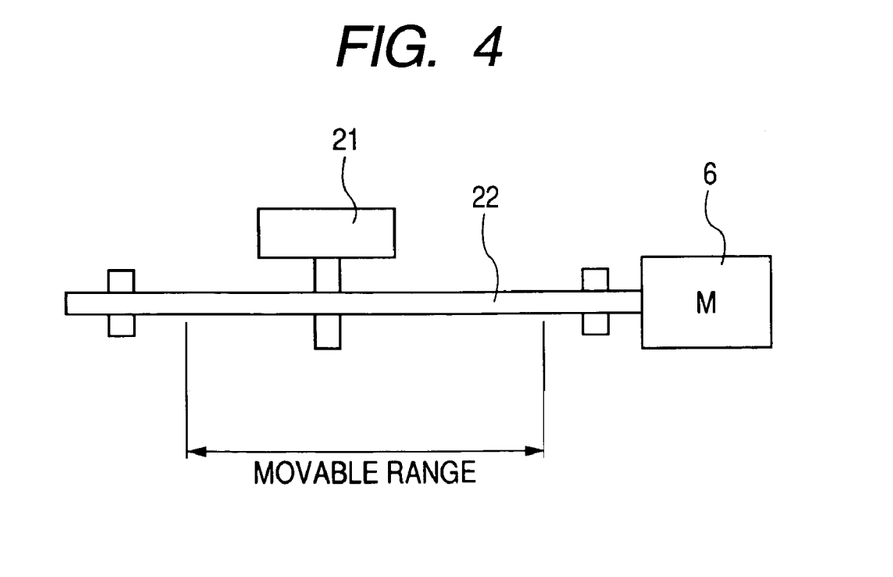
FIG. 4 is a view showing a movable range of a machine which is driven by the servo control device shown in FIG. 1.

FIG. 4 is a view showing a movable range of a machine which is driven by the servo control device shown in FIG. 1.

In FIG. 1, reference numeral 1 denotes a vibration detecting circuit; 2 a CPU; 3 a current amplifier; 4 a base drive circuit; 5 a power transistor module; and 6 a motor.

FIG. 2 is a block diagram of speed control. Reference numeral 11 denotes speed control unit. For example, in the case of the speed control, in response to a speed command, the speed control outputs a torque command having adjustment gains such as a speed loop gain K and an integration time constant T to drive 1/JS (12) corresponding to a motor and a load. Thereafter, a speed feedback ω and the speed command are supplied to a subtracter, thereby performing the speed control to remove a speed deviation.

FIG. 3 is a timing chart of a loop gain and torque waveform.

When the gain is increased from G0 to G1, as seen from the lower part of FIG. 3, the torque or speed oscillates. Then, the gain is lowered to G2, thereby adjusting the torque or speed into a stationary state.

In this case, the detection of vibration may be performed by a system as disclosed in the prior art JP-A-Hei2-261083 in which the servo motor is placed in a stick-step state (repetition of normal rotation and reverse rotation) to increase the gain of a parameter and thereafter the amplitude and frequency are analyzed using an FET by CPU to detect the vibration, or otherwise a method in which a difference between torque command values T(i) and T (I–1) for each of sampling cycles is acquired and the number of times of the sign within a predetermined period is estimated through statistical operation. Further, an integrating gain and torque filter may be changed with the gain.

Further, at a place where the gain is not increased, the vibration of a machine is suppressed using the filter.

Next, the operation will be explained.

The microcomputer 2 receives a command of a position or speed from an external controller. For example, in the case of the speed command, the microcomputer 2 performs the speed control like the speed control 11 as shown in a block diagram of FIG. 2. By the output current command or an output of current control, the power transistors 5 are switched through the base drive circuit 4 as shown in FIG. 1 to control the motor 6, thereby driving a machine such as a ball screw 22 or a table 21 as shown in FIG. 4.

The vibration detecting circuit 1 detects the vibration when it exceeds a predetermined level thereof. The adjustment is implemented at a plurality of adjustment points over a movable range of the machine as shown in FIG. 4. First, at each measurement point, as shown in FIG. 3, the adjustment is made in such a fashion that if the vibration is detected in the process of increasing the gain from G0 to G1, the gain is decreased so that gain G2 when the vibration becomes still is set as the maximum value. Such gain adjustment is implemented at each of the adjustment points moved over the entire movable range of the machine.

Further, the gain adjustment is implemented over the entire movable range. A minimum value of the adjustment gains at the adjustment points is set as the entire adjustment gain. If the gain in a speed control system is set taking the characteristic of the machine or confirming it again, the gain adjustment is more practical.

Incidentally, in the speed control 11, in the case of a simple proportional-plus-integral control (PI control), the gain is expressed by $$K/(1+TiS)$$

where K: speed loop gain
Ti: integration time constant

However, in the control method such as IP control or PID control other than the proportional-plus-integral (PI) control, the gain adjustment can be implemented in the same manner.

As described above, in accordance with the first embodiment, by implementing the gain adjustment in such a manner that the speed loop gain is increased to detect vibration at each of points moved over a movable range of a machine, the gain where the vibration becomes still is detected as a maximum value of adjusted gains, and a minimum value of these adjusted gains is adopted as the entire adjusted gain, it is possible to realize stabilized adjustment with a margin for the vibration, thus suppressing changes according to the places of the machine.

The above gain adjustment can be also applied to the adjustment of the machine itself.

Next, referring to a control block diagram of FIG. 5, a timing chart of FIG. 6, a maximum gain extracting timing chart of FIG. 7 and a flowchart of FIG. 8, an explanation will be given of the operation according to the second embodiment in the circuit in FIG. 1.

The microcomputer 2 receives a command of a position or speed from an external controller. For example, in the case of the speed command, the microcomputer 2 performs the speed control. By the output current command or an output of current control, the power transistors 5 are driven through the base drive circuit 4 to control the motor 6.

The vibration detecting circuit 1 detects the vibration when a vibration component contained in a during-stopping torque command exceeds a predetermined level. Running is done with a low gain as shown in FIG. 6(*i*), and as a detection level of vibration, the amplitude level of torque vibration during stopping in the normal running is detected as shown in FIG. 6 (*ii*). The detection level of vibration may be e.g. about five times as large as the vibration level at the low gain.

Figure 6:
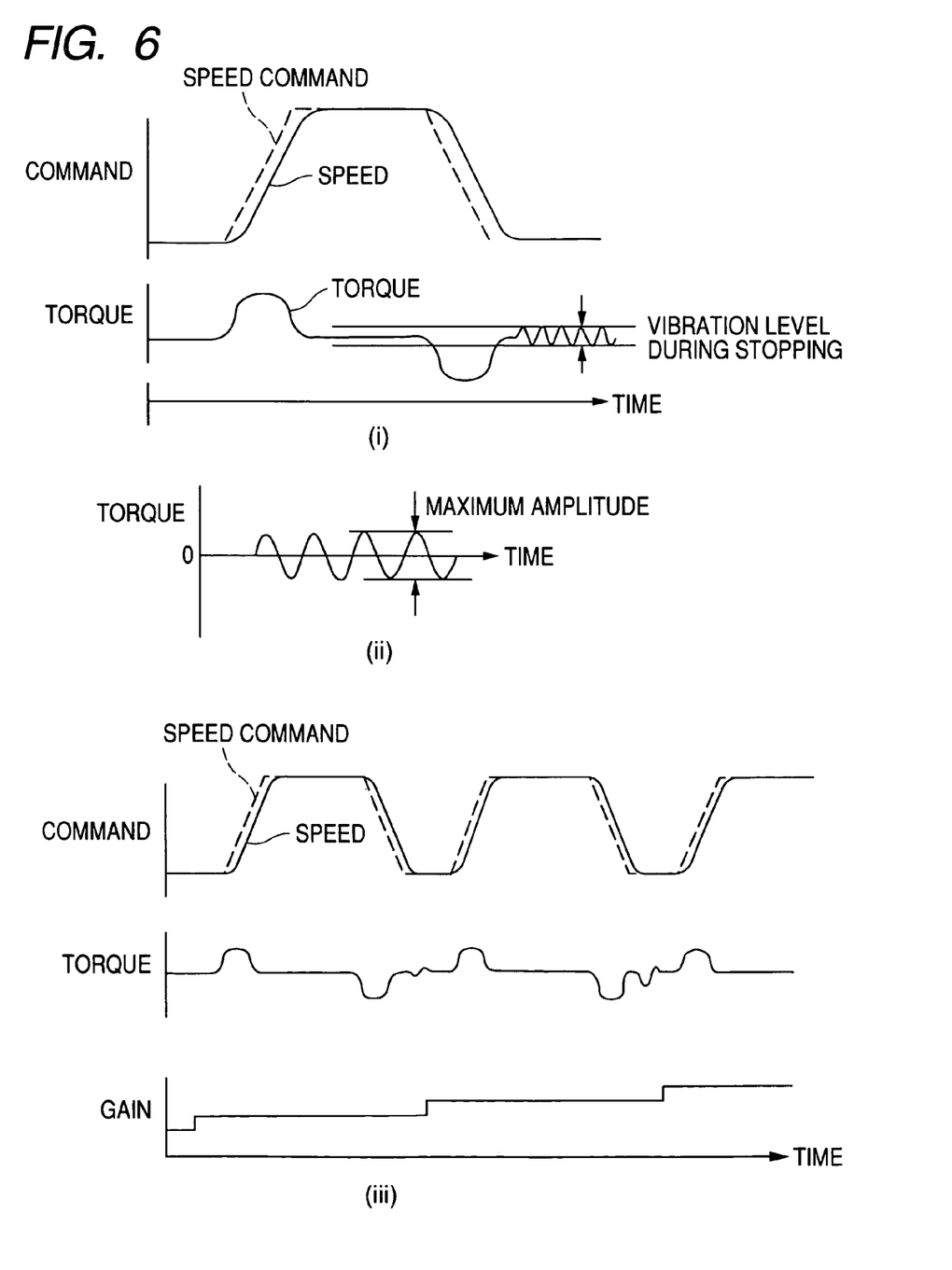
FIG. 6 is a measurement timing chart of a speed command, a speed, a torque waveform and a vibration level during normal running.

For detection of the controlled gain, as shown in FIG. 6(*i*), first, the amplitude of the torque is observed during stopping at a low gain. Next, at a gain increased as shown in FIG. 6(*iii*), running is done. During the stopping thereof, the amplitude of the torque is measured. If the amplitude is larger than e.g. about five times as large as that at the low gain, the controlled gain is adopted as a maximum gain. If the gain is gradually increased, great oscillation does not occur, but slight vibration may occur during the stopping. Automated gain adjustment is carried out so as to suppress the vibration.

Figure 7:
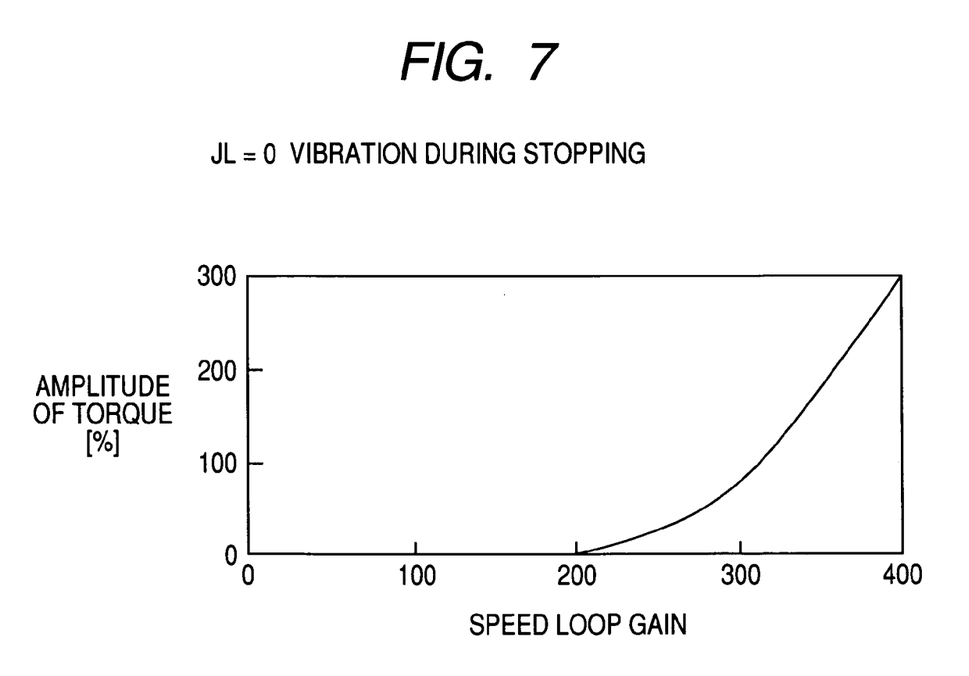
FIG. 7 is a graph showing the relationship between a speed loop gain and the amplitude of a torque during stopping.

The relationship between the speed loop gain and the amplitude of vibration of the torque when the vibration occurs during the stopping is shown in FIG. 7. As seen from FIG. 7, when the speed loop gain exceeds a certain value, the amplitude of vibration of the torque abruptly increases. Thus, the gain when the amplitude of torque has abruptly increased can be determined as the maximum gain.

An explanation will be given of a series of operations.

Figure 8:
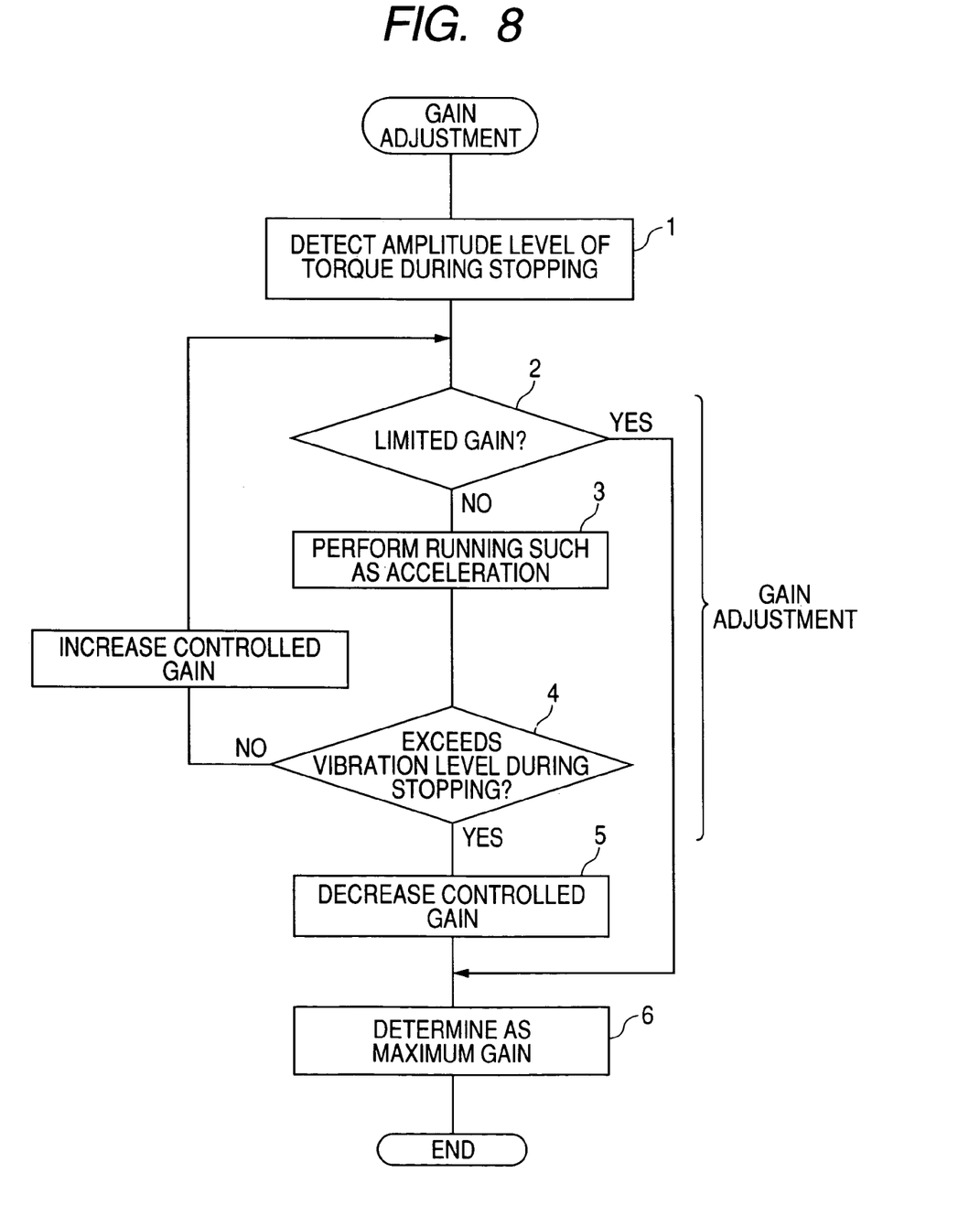
FIG. 8 is a schematic flowchart of adjusting a control gain.

First, at flow 1 in FIG. 8, the running such as acceleration/deceleration is done to detect the vibration level of torque during stopping. At flow 2 in FIG. 8, whether or not the controlled gain is within a limited value is determined. This limited value may be decided in terms of the characteristic of the machine or by measurement. If the controlled gain is at the limited value, it is determined as the maximum value, thereby ending the adjustment of gain. If the controlled gain is within the limited value, the following adjustment of gain proceeds. At flow 3 in FIG. 8, the running such as acceleration/deceleration is done. At flow 4 in FIG. 8, whether or not the controlled gain exceeds the level of torque vibration during stopping is determined. If exceeds, at flow 5 in FIG. 8, the controlled gain is decreased. The gain thus decreased is determined as the maximum gain, thereby ending the adjustment of gain. In not exceed, the controlled gain is increased. The operations at flows 2 to 4 in FIG. 8 are repeated. In this way, the controlled gain is adjusted.

The vibration detecting circuit 1 (FIG. 1) may be realized by the microcomputer 2. Further, the integration gain or torque filter may be changed with the controlled gain.

In accordance with the second embodiment, by adjusting the controlled gain through the normal running, occurrence of the vibration or noise during stopping can be suppressed, thereby stabilizing the controlled gain.

Figure 9:
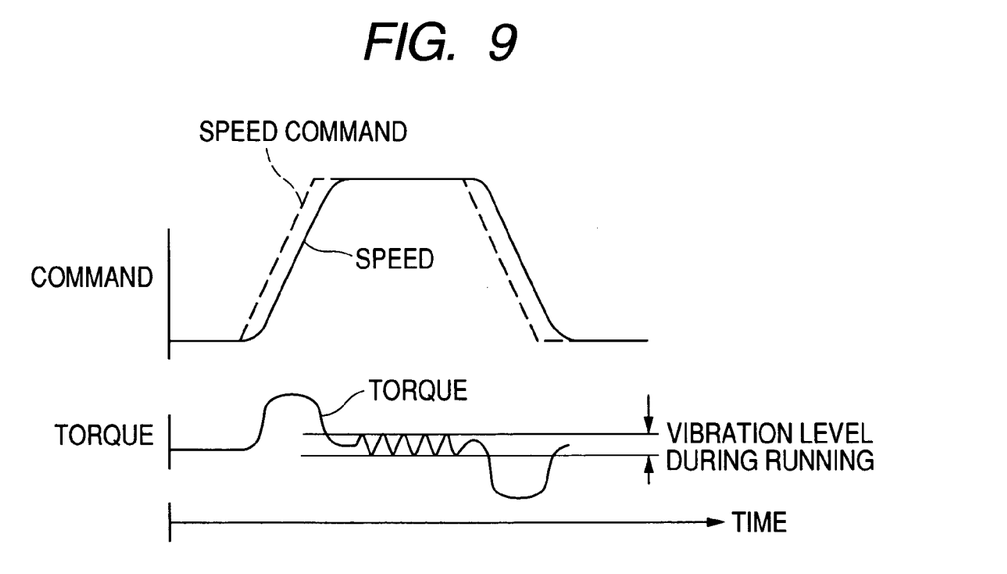
FIG. 9 is a measurement timing chart of a speed command, a speed, a torque waveform and a vibration level during normal running.

Next, referring to a control block diagram of FIG. 5, a timing chart of FIG. 9, a maximum gain extracting timing chart of FIG. 10 and a flowchart of FIG. 11, an explanation will be given of the operation according to the third embodiment in the circuit in FIG. 1.

Figure 5:
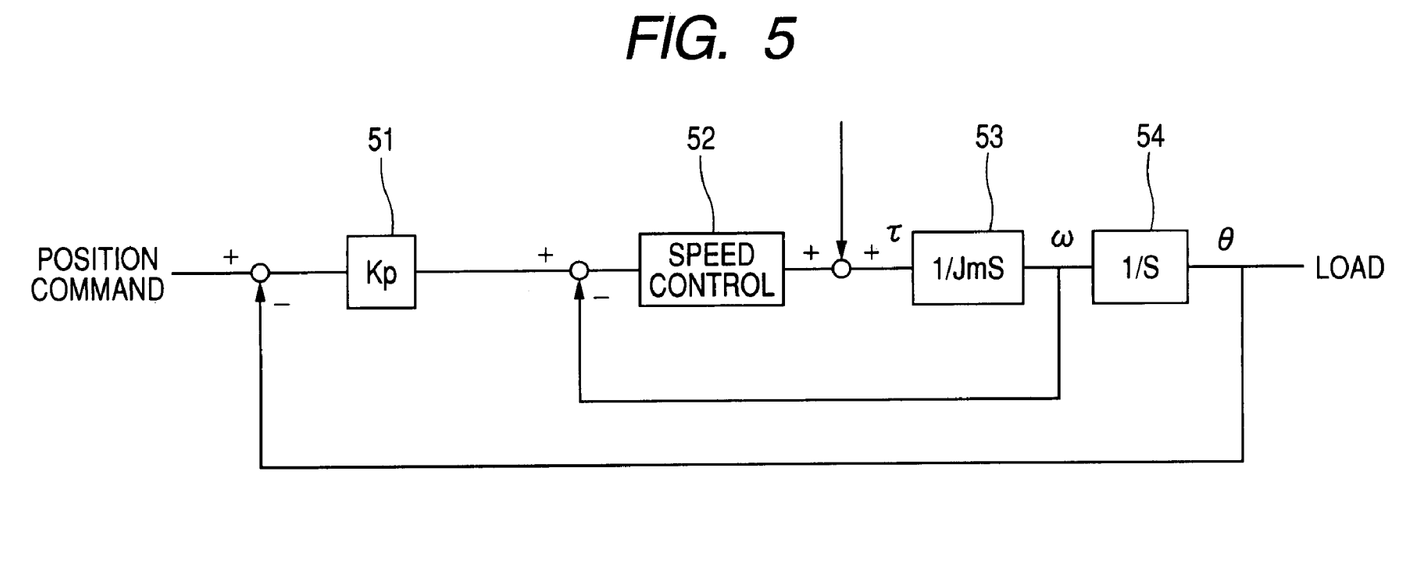
FIG. 5 is a control block diagram relative to a second embodiment and a third embodiment.

The control block diagram of FIG. 5 illustrates the position control operation which is carried out by the CPU 2 in FIG. 1. In FIG. 5, a position feedback supplied from a load is subtracted from a position command. The resultant value is multiplied by Kp to perform position control. A difference between the value thus obtained and a speed feedback o is supplied to speed control 52 to output a torque command, thereby driving 1/JS53 corresponding to a motor and a load. Thereafter, a speed feedback ω and the speed command are supplied to a subtracter, thereby performing the speed control to remove a speed deviation. The speed ω thus acquired is integrated by integration 54, thus ending the position control operation.

In the operation in this embodiment, the microcomputer 2 in FIG. 1 receives a command of a position or speed from an external controller. For example, in the case of the speed command, the microcomputer 2 performs the speed control operation. By the output current command or an output of current control, the power transistors 5 are driven through the base drive circuit 4 to control the motor 6. The vibration detecting member 1 detects the vibration when a vibration component contained in a torque command or speed signal of the motor exceeds a predetermined level. As a detection level of vibration, the amplitude level of torque vibration during the normal running or running peculiar to the machine is detected as shown in FIG. 9. In FIG. 9, the maximum value of the amplitude of torque vibration during the normal running is detected.

The detection level of vibration may be e.g. about three times as large as the vibration level during the normal running.

For detection of the controlled gain, first, simulated disturbance is added to a torque command at a low gain to confirm a response. If there is no response, the simulated disturbance torque is increased. The simulated disturbance is increased until there is the response increased to a certain degree, or otherwise the level of response is lowered.

Next, the controlled gain is gradually increased to add the simulated disturbance torque to the torque command in FIG. 5, thereby confirming the vibration. The confirmation that the vibration is stopped is obtained from the amplitude of the speed and torque. If the vibration is detected, the vibration is stopped by lowering the controlled gain to the level where the vibration does not occur or squeezing the torque. Finally, the controlled gain providing the vibration is computed. The controlled gain computed is determined as the maximum gain.

The concrete procedure of gain adjustment is as follows. First, in step 1 in FIG. 11, with the gain of the control system such as a position loop or speed loop being set at a low gain, as seen from FIG. 9, the vibration level is detected during the normal running or during the running peculiar to the machine. In FIG. 9, the maximum value of the amplitude of torque vibration during the normal running is detected.

Figure 11:
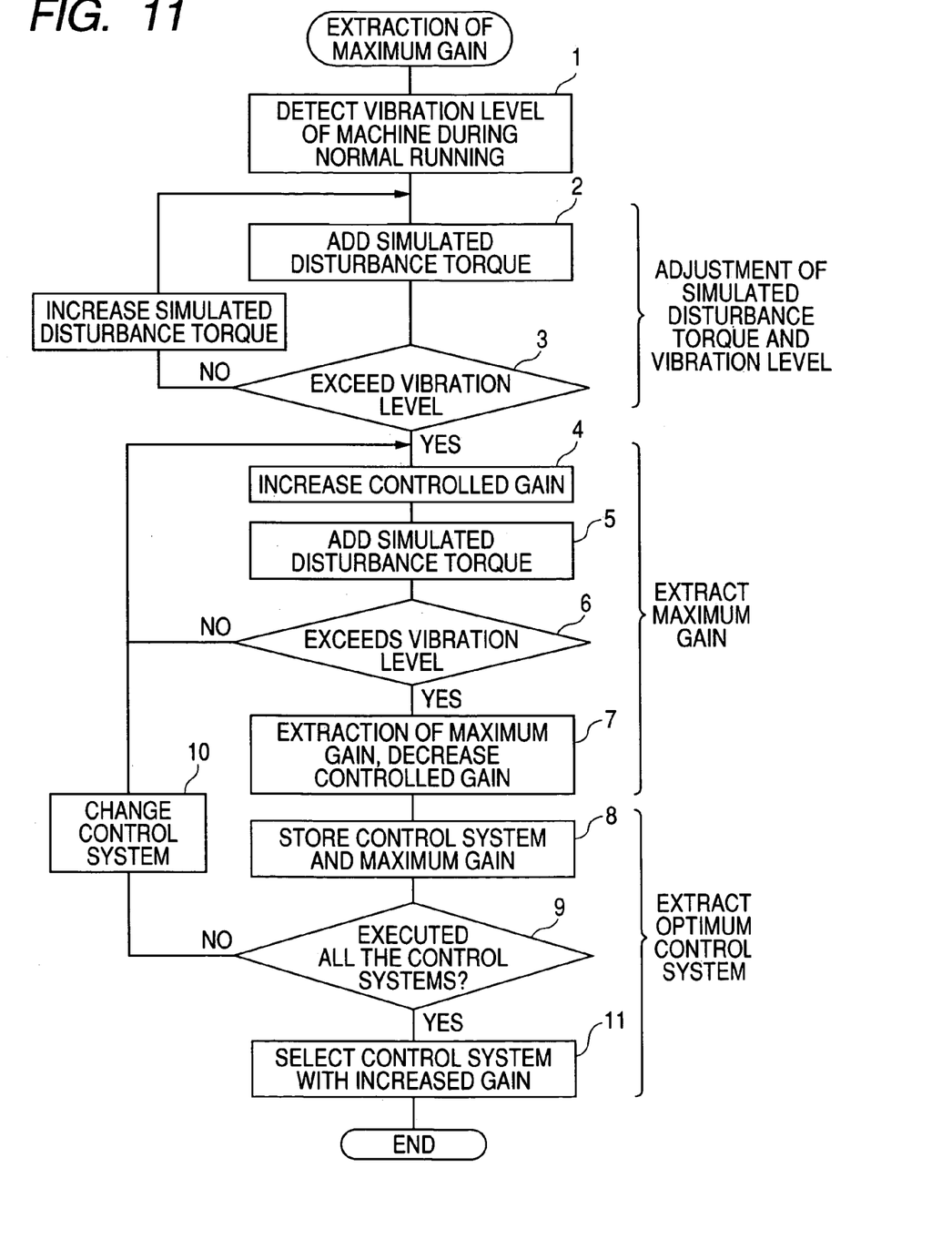
FIG. 11 is a schematic flowchart of extracting the maximum gain in this invention.

In step 2 of FIG. 11, with the gain of the control system being set at the low gain, the simulated disturbance torque is added in steps to the torque command $\tau_{ref}$. In step 3 of FIG. 11, whether or not the response of the position deviation or speed exceeds a predetermined level is confirmed. If there is not the response exceeding the predetermined level, assuming that the simulated disturbance torque added has not exceeded a mechanical load, the simulated disturbance torque is increased. The simulated disturbance torque is increased so that the response is increased to a predetermined level. The level of the response of the maximum value is may be e.g. twice as large as the amplitude during the normal running. If the simulated disturbance torque is increased to a certain level, where the response is not increased, the detection of response is lowered. In this way, the magnitude of the simulated disturbance torque and the detection of the response are adjusted.

Figure 10:
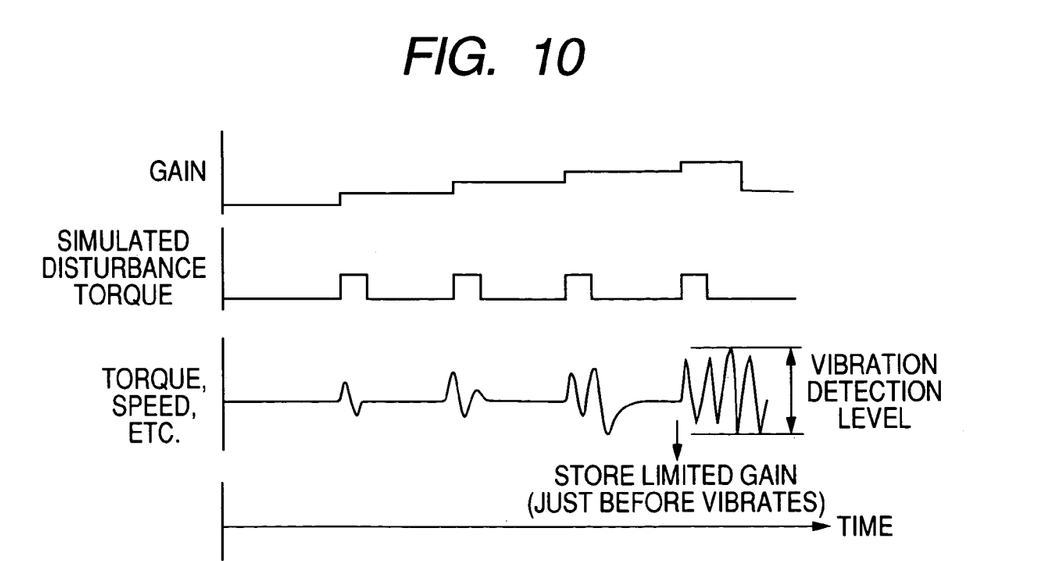
FIG. 10 is a timing chart of generating vibration by increasing the control gain and extracting the decreased gain and the maximum gain when the vibration is generated.

After the magnitude of the simulated disturbance torque is increased step by step at timings as shown in FIG. 10. After the controlled gain has been increased like steps 4 to 6 of FIG. 11, the simulated disturbance torque is added to the torque command so that the vibration is confirmed by the vibration detecting member 1 (FIG. 1). The vibration detecting member 1 compares the amplitude of the torque or speed with a vibration detection level and detects the amplitude when it is lager than the detection level. The vibration detection level is set at e.g. 1.5 times as large as the response level previously adjusted.

After the simulated disturbance torque has been added, in step 6 in FIG. 11, if the vibration exceeding a certain level is detected, addition of the simulated disturbance at the timings shown in FIG. 10 is stopped. In step 7 in FIG. 11, the controlled gain is lowered to the level where the vibration does not occur (half of the vibration occurring level, low gain initially set, etc.). Otherwise, in order to stop the vibration surely, the torque command is squeezed or the location deviation is made zero in a moment. In step 8 in FIG. 11, the controlled gain just before that when the vibration occurs and the control system are stored in the storage member such as a microcomputer as the maximum gain. The controlled gain thus stored is the maximum gain in this control system. Next, in step 9 of FIG. 11, whether or not all the control systems have been implemented is determined. Where the control system to be implemented still remains, in step 10 of FIG. 11, the control system is changed to detect the maximum gain from step 4. In step 9 of FIG. 11, if all the control systems have been implemented, in step 11 of FIG. 11, the control system with the controlled gain increased is selected as an optimum control system.

The vibration detecting circuit 1 may be realized by the microcomputer 2. Further, an integrating gain and torque filter may be changed with the gain.

In accordance with the third embodiment, the vibration is surely caused to occur using the simulated disturbance torque suited to a machine, thereby acquiring the maximum gain. In addition, immediately after the vibration has occurred, it can be suppressed by decreasing the gain so that it is not necessary to increase the gain greatly. Thus, the danger due to occurrence of the vibration can be prevented. Further, the optimum control method can be automatically selected and adjusted.

Figure 13:
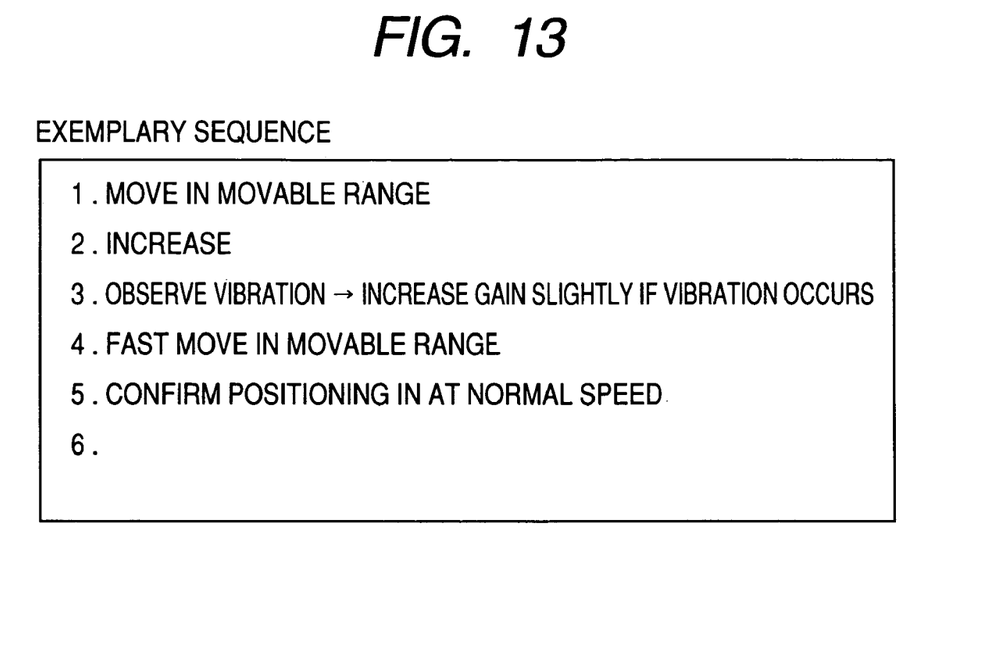
FIG. 13 is a view showing an exemplary sequence.
Figure 14:
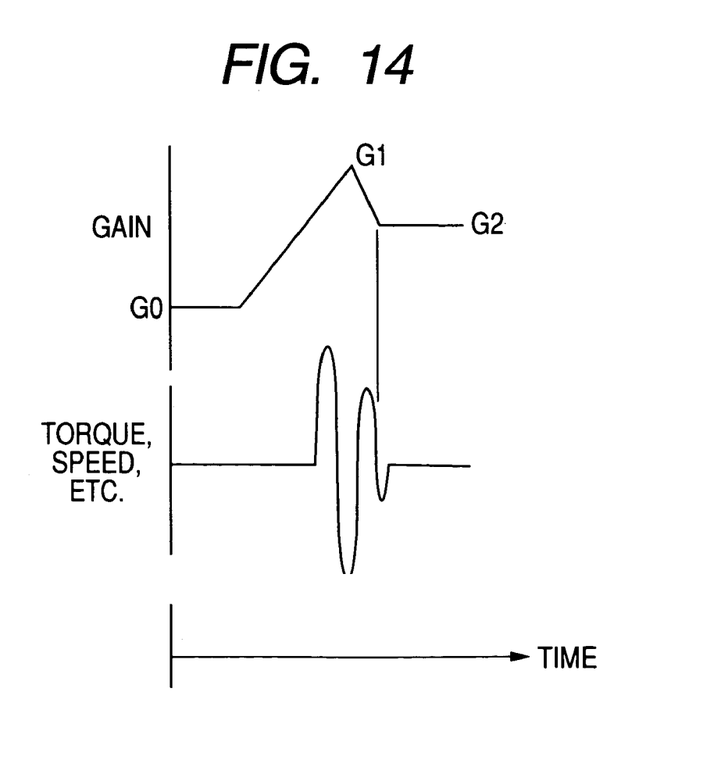
FIG. 14 is a waveform timing chart of a gain and torque or speed.

Next, referring a sequence example of FIG. 13 and a timing chart of FIG. 14, an explanation will be given of the operation of the fourth embodiment in the circuit of FIG. 12.

Figure 12:
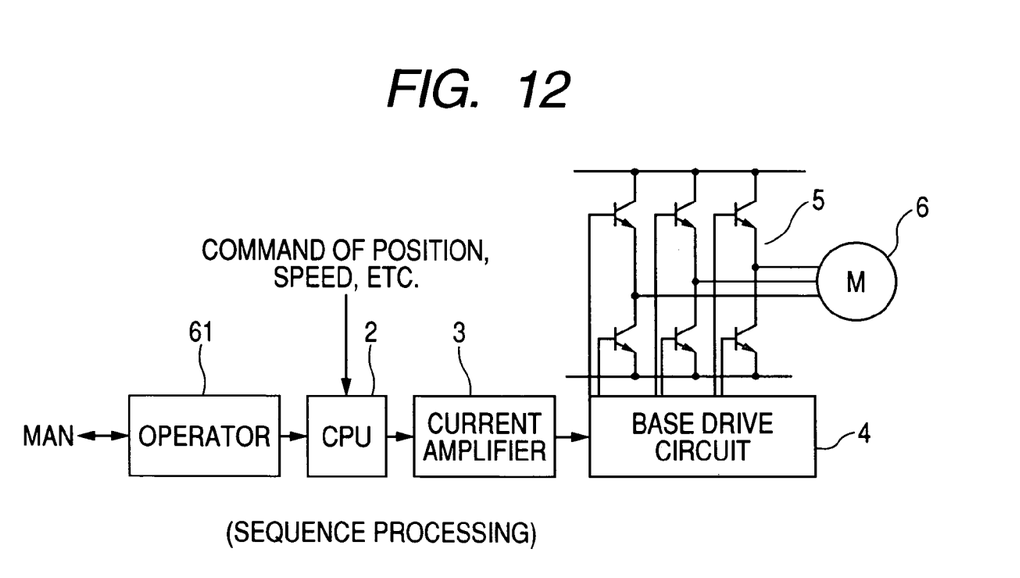
FIG. 12 is a view showing the construction of a servo control device for explaining the operation according to a fourth embodiment.

First, the CPU (microcomputer) 2 in FIG. 12 generally receives a command of a position or speed from an external controller. For example, in the case of the speed command, the microcomputer 2 performs the speed control operation. By the output current command or an output of current control, the power transistors 5 are driven through the base drive circuit 4.

Now, for the purpose of an adjustment operation, a man uses an operator 61 to carry out the adjustment operation. In this case, the adjustment operation is carried out according to e.g. a sequence of FIG. 13. The sequence is implemented by the microcomputer 2.

In the sequence, first, the movable range as shown in FIG. 4 is moved divisionally (Step 1). On the way, the gain is increased (Step 2). The situation such as the vibration is observed (Step 3). After the gain has been determined, the movable range is fast moved (Step 4) to determine that the vibration has not occurred. If the vibration occurs, the vibration is detected and the gain is lowered (Step 3). Thereafter, at a normal speed, positioning is confirmed (Step 5). This sequence may be determined beforehand, or rearranged freely. The command may be automatically created by the sequence or externally supplied. In this way, a series of adjustment operations will be carried out.

As understood from the above description, in accordance with the fourth embodiment, a servo control device for driving a servo motor is run by generating a command by an external operation of an operator and from a sequence of tuning build in the device, and the gain is increased/decreased by the information obtained at this time and hence determined in real time. Thus, the gain can be instantaneously determined from the vibration information. Even when the vibration occurs because of differences in machines, the gain can be instantaneously lowered and stopped.

This invention has been explained in detail referring to various embodiments. It is apparent to those skilled in the art that various changes and modifications can be made without departing from the sprit and scope of this invention.

INDUSTRIAL APPLICABILITY

As described hitherto, in accordance with this invention, by implementing the gain adjustment in such a manner that the speed loop gain is increased to detect vibration at each of points moved over a movable range of a machine, the gain where the vibration becomes still is detected as a maximum value of adjusted gains, and a minimum value of these adjusted gains is adopted as the entire adjusted gain, it is possible to realize stabilized adjustment with a margin for the vibration, thus suppressing changes according to the place of the machine.

The above gain adjustment can be also applied to the adjustment of the machine itself.

Further, by adjusting the controlled gain through the normal running, occurrence of the vibration or noise during stopping can be suppressed, thereby stabilizing the controlled gain.

Further, the vibration is surely caused to occur using the simulated disturbance torque suited to a machine, thereby acquiring the maximum gain. In addition, immediately after the vibration has occurred, it can be suppressed by decreasing the gain so that it is not necessary to increase the gain greatly. Thus, the danger due to occurrence of the vibration can be prevented. Further, the optimum control method can be automatically selected and adjusted.

Further, since the sequence is built in by an external operation, the gain can be detected in real time and also by the information obtained at this time and hence can be instantaneously determined from the vibration information. Even when the vibration occurs because of differences in machines, the gain can be instantaneously lowered and stopped.

The invention claimed is:

1. A gain adjusting method for a servo control device providing speed control of inputting a difference between speed feedback supplied from a servo motor and a command value to output a torque command,
   the gain adjusting method comprising the steps of:
   increasing a speed loop gain to detect vibration at each of a plurality of points over a movable range of a machine,
   decreasing the speed loop gain to detect the gain when the vibration becomes still as a maximum value, and
   providing a set gain value corresponding to a machine.

2. The gain adjusting method for a servo control device according to claim 1, wherein
   the set gain value is a minimum value of gain values detected at the plurality of points.

3. A method for adjusting a controlled gain in a servo control device for driving a servo motor including a vibration detecting member for detecting vibration of a control system while the control system stops, comprising the steps of:
   performing running such as acceleration/deceleration at an increased controlled gain, and
   decreasing the controlled gain, when the vibration is detected by the vibration detecting member while the control system stops.

4. The method for adjusting a controlled gain according to claim 3, wherein
   the vibration during stopping is detected from torque in the normal running is detected, and
   when the vibration is detected by the vibration detecting member,
   the controlled gain is decreased.

5. The method for adjusting a controlled gain according to claim 3, wherein
   the vibration during stopping in the normal running is detected, and
   when the vibration is detected at an increased gain by the vibration detecting member,
   the gain at this time is determined as a maximum gain.

6. A method for adjusting a controlled gain, comprising the step of:
   selecting a control method such as an observer in a limited gain extracting method,
   the limited gain extracting method including the steps of:
   determining as a limited gain the gain when the vibration exceeding the predetermined level is detected by the vibration detecting member,
   repeating the processing of giving the excitation having an adjusted magnitude by the exciting member,
   detecting the vibration by the vibration detecting member, and
   adding the simulated disturbance torque while increasing the controlled gain, until the vibration at the predetermined level is detected.

7. The method for adjusting a controlled gain according to claim 6, wherein
   in selecting the control method such as the observer in the limited gain extracting method, the control method with a higher value of the limited gain is selected as an optimum control method.

8. The method for adjusting a controlled gain according to claim 7, wherein
   the control method with a higher value of the limited gain is selected as an optimum control method,
   the method, further comprising the steps of:
   increasing the simulated disturbance torque,
   detecting the margin of the controlled gain where the vibration at a predetermined level is detected, and
   selecting the control method providing a larger margin, wherein
   the control method with the higher value of the limited gain is selected as the optimum control method,
   if pertinent control methods have equal limited gains.

9. A gain adjusting method for a servo control device providing speed control of inputting a difference between speed feedback supplied from a motor and a command value to output a torque command,
   the gain adjusting method comprising the steps of:
   implementing tuning such that a servo control device for driving a servo motor is run,
   generating a command by an external adjustment operation of an operator and a sequence of tuning build in the device, and
   adjusting the gain by the obtained information upon running.

* * * * *